United States Patent [19]

Snow et al.

[11] Patent Number: 4,457,544

[45] Date of Patent: Jul. 3, 1984

[54] CONNECTOR FOR FLEXIBLE ELECTRICAL CONDUIT

[75] Inventors: Thomas M. Snow, Park Ridge; Bernard J. Muslin, Evanston, both of Ill.

[73] Assignee: Liquid Tight Corporation, Bensenville, Ill.

[21] Appl. No.: 520,220

[22] Filed: Aug. 5, 1983

Related U.S. Application Data

[63] Continuation of Ser. No. 292,571, Aug. 13, 1981, abandoned.

[51] Int. Cl.$^3$ ........................ F16L 33/00; F16L 19/00; F16L 15/00

[52] U.S. Cl. .................................... 285/251; 285/355; 285/391; 285/92; 285/DIG. 4

[58] Field of Search ............... 285/251, 355, 161, 391, 285/DIG. 4, 92

[56] References Cited

U.S. PATENT DOCUMENTS 884,461 4/1908 Browne .............................. 285/251
1,440,508 1/1923 Todd .............................. 285/251 X
2,475,322 7/1949 Horton et al. .................. 285/391 X
4,174,858 11/1979 Brooks .......................... 285/DIG. 4
4,224,464 9/1980 Bunnell et al. ................. 285/161 X

FOREIGN PATENT DOCUMENTS 850967 12/1939 France ............................... 285/251

*Primary Examiner*—Richard J. Scanlan, Jr.
*Attorney, Agent, or Firm*—Merriam, Marshall & Bicknell

[57] ABSTRACT

A connector for a liquid tight, flexible electrical conduit formed of a plurality of interlocking, thin, arcuate metal ring sections having an interior wall of alternating ridges and grooves. The connector includes a ferrule end insertable into the conduit with a plurality of spatially separated arcuate segments matching the conduit grooves for threadable engagement. A resilient seat member snug fit onto the ferrule is engaged by the conduit end as the conduit is threaded onto the ferrule to sealingly terminate the full perimeter edge of the conduit end, thereby enabling the conduit and connector assembly to be air and liquid tight. One or more ramp formed barbs are provided on one or more of the ferrule arcuate segments to lock and secure the connector on the conduit and prevent undesired loosening.

11 Claims, 4 Drawing Figures

22 20 36 38 4 12 18 26 28 35 27 14 16 24 27 38 37 26 4

10
12
36
22
20
3
18
38
37
35
24
26
30
27
28
14
16
4
34
32

CONNECTOR FOR FLEXIBLE ELECTRICAL CONDUIT

This application is a continuation, of application Ser. No. 292,571, filed Aug. 13, 1981 now abandoned.

This invention relates to connectors for electrical conduits, and in particular to an improved sealed end connector for a gas tight and liquid tight, flexible electrical conduit.

BACKGROUND OF THE INVENTION

A new, somewhat flexible metal conduit has been developed for containing electrical wires sealed and protected from the environment. However, the new conduit requires sealed end connectors to connect the conduit to electrical devices, junction boxes, etc.

The newly developed flexible conduit is formed of a plurality of interlocking sections of thin, arcuate metal members which present a continuous surface of alternating grooves and ridges on both the exterior and interior walls thereof, enabling the conduit to be flexible as well as air tight and liquid tight. Such flexible metal conduits with sealed end connectors would be particularly useful with lighting fixtures in suspended or plenum ceilings to prevent sprinkler systems shorting out the electrical wiring and to prevent smoke from escaping into the plenum ceiling in the event of a fire within the conduit or the raceway system. Electrical code requirements are particularly severe with regard to isolating the electrical system from the air in a suspended ceiling which normally serves as a return plenum in forced air heating systems.

Reference may be made for instance to U.S. Pat. Nos. 3,895,177 and 3,992,044, assigned to the same assignee as herein, wherein there is described a flexible conduit commonly referred to as Greenfield conduit having an air and liquid tight polyvinyl chloride (PVC) covering combined with sealed end connectors to form a conduit and connector assembly meeting electrical code requirements for use in plenum ceilings. In the event of a fire, however, it has been found that overheating of the PVC covering may cause toxic fumes to enter the forced air heating system from the plenum ceiling. While the aforementioned newly developed metal conduit would eliminate the possible toxic fume problem, the sealed end connectors used with the PVC covered Greenfield conduit cannot be used and are not adaptable for use with the new conduit.

It is thus desired to provide a smoke tight, liquid tight and dust tight, sealed end connector for the new conduit. Also, it is desired to provide the ready fabrication of a sealed conduit and connector assembly which can be made up either on the job-site or at a manufacturing facility.

SUMMARY OF THE INVENTION

In accordance with the principles of the present invention, there is provided a sealed end connector for a liquid tight, flexible electrical conduit formed of a plurality of interlocking sections of thin, arcuate metal members and having an interior wall of alternating ridges and grooves. The connector includes an elongated hollow body with an annular ridge projecting from the body outer surface and intermediate a threadable mating end and a ferrule end adapted for insertion into the conduit. The ferrule end is provided with a plurality of spatially separated arcuate segments matching the arcuately formed groove members in the interior wall of the electrical conduit so that the ferrule can be threadably engaged into the conduit end. A resilient seat member is provided on the ferrule adjacent the annular ridge and with sufficient thickness and density so as to resiliently engage and sealingly terminate the full perimeter edge of the conduit end within the seat as the ferrule is threaded onto the conduit. An annular seat member formed of a resilient material of about 70 Durometer with an inner diameter of about 7–10% less than the outer diameter of the ferrule may be utilized; With the conduit end engaged within the resilient seat member, the assembled conduit and connector is sealed together and is therefore air and liquid tight.

The connector can be readily installed on the conduit without requiring any special tools. Thus, a reliable sealed end termination can be provided in the field. Alternatively, a completely assembled conduit with sealed end terminations and of a desired length can be readily fabricated, if so desired.

In a preferred embodiment of the invention, at least one of the arcuate ferrule segments includes a slightly raised ramp portion ending in a barb for bitingly engaging the conduit interior wall, thereby locking and securing the connector to the conduit. The slightly raised ramp portion is formed with the low point of the ramp constituting the leading edge in the direction of threadable engagement with the conduit, and the high point of the ramp or the barb constituting the trailing edge in the direction of threadable engagement. However, once the connector has been located within the conduit, the ramp high point or barb becomes the leading edge in the direction of unthreading the connector from the conduit thus locking and preventing the connector from undesirably loosening in the event of conduit movement or vibration.

Several alternative embodiments of the seal and locking provisions are described. Included for instance are resilient seal threads on the ferrule; an external sleeve sealed to the conduit exterior surface; variable spacing between adjacent ferrule threads; the addition of an external sleeve cooperating with the ferrule to prevent any conduit expansion and possible separation from the sealed end termination; as well as other embodiments.

BRIEF DESCRIPTION OF THE DRAWINGS

The features of this invention which are believed to be novel are set forth with particularity in the appended claims. The invention, together with its object and the advantages thereof, may be best understood by reference to the following description taken in conjunction with the accompanying drawings, in which like reference numerals identify like elements in the several figures and in which:

DETAILED DESCRIPTION

Figures 1, 2, 3, 4:
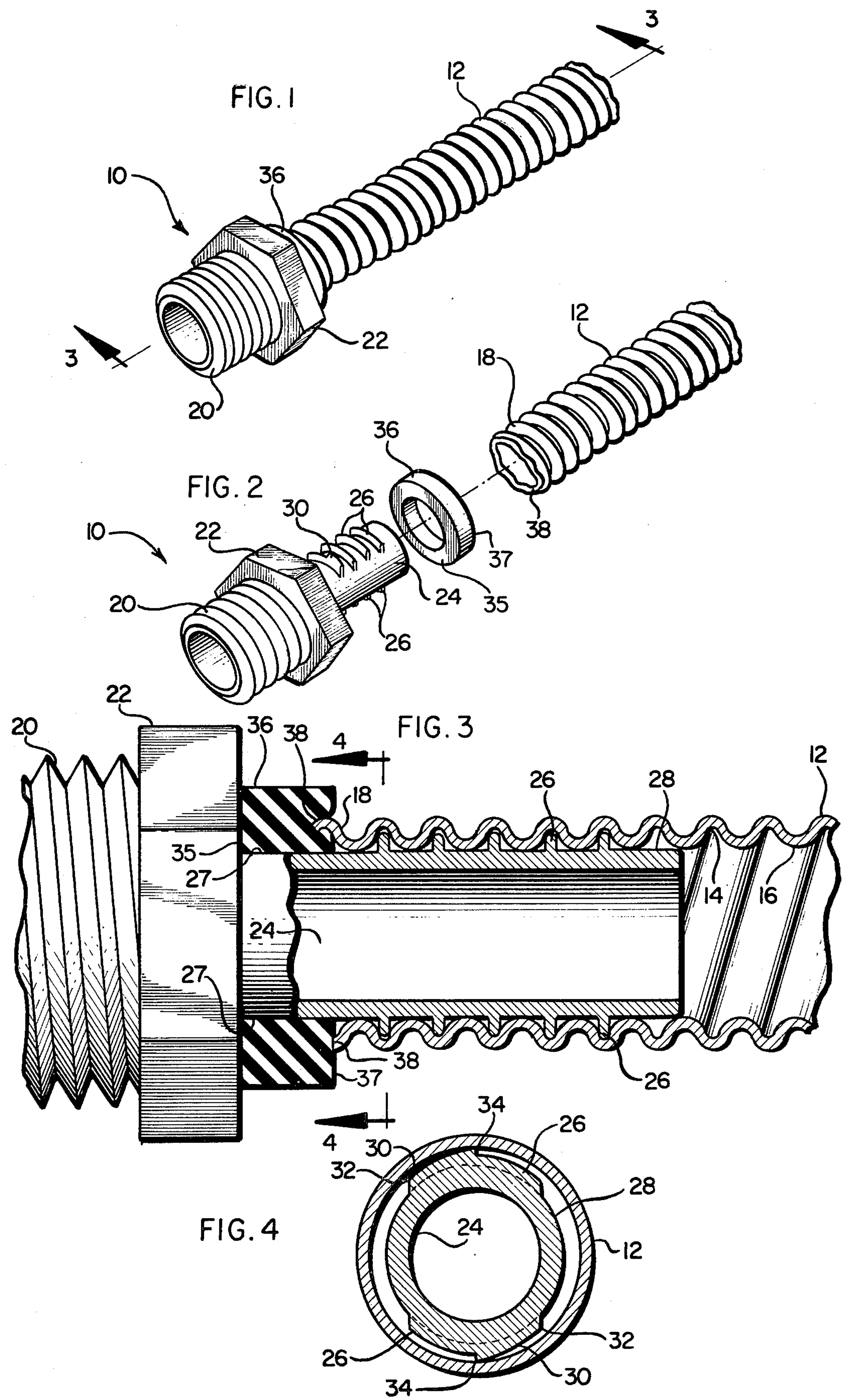
FIG. 1 is a perspective view of a flexible electrical conduit sealingly terminated with a connector constructed in accordance with the principles of the present invention.
FIG. 2 is a perspective view in exploded form illustrating a preferred embodiment of a sealed end connector according to the principles of the present invention.
FIG. 3 is a sectional elevational view showing the electrical conduit terminated in a smoke tight, water tight and dust tight connection at the conduit edge end.
FIG. 4 is a sectional view taken along lines 4—4 of FIG. 3 illustrating a pair of raised ramps providing barbs at the high point thereof to lock the connector in position within the conduit.

Referring now to FIG. 1, there is illustrated a connector 10 constructed in accordance with the principles of the present invention for sealingly terminating a flexible electrical conduit 12 of the type illustrated. The flexible electrical conduit is of a new type formed of a plurality of metal, thin wall arcuate ring sections. Each ring section includes a series of alternating grooves and ridges on both the exterior and interior surfaces thereof. As shown in FIG. 3, the sections are consecutively interlocked so that the interior wall of conduit 12 is formed of a continuous surface of alternating grooves 14 and ridges 16. Thus, the conduit is flexible at the interlocking sections as well as air and liquid tight.

The improved connector 10 provides an air tight, liquid tight and dust tight sealed termination for the conduit end, such as end 18. Connector 10 is formed of a metal, elongated hollow body with one threaded end 20 adapted for insertion into an electrical box opening or for connection to other standard electrical conduit components, such as couplers, fixture boxes, etc. Threaded end 20 is therefore adapted to mate with a standard nut in securing the connector. The connector further includes an annular ridge 22 and a ferrule end 24, with the ferrule end being adapted for insertion within the interior of conduit 12 as shown in FIG. 3.

The ferrule end 24 includes a plurality of spatially separated arcuate segments 26 integral with and projecting from the exterior surface 28 of the ferrule. As shown in FIGS. 2, 3 and 4, at least two opposing sets of arcuate segments 26 are formed on ferrule outer surface 28, with the segments adapted as shown in FIG. 3 so as to enable threadable engagement within respective grooves 14 as the ferrule is threadably engaged onto conduit end 18.

At least one of the arcuate ferrule segments 26 in each set is formed with a raised ramp portion 30 having a low point 32 and a high point 34. High point 34 presents a barb which bites or cuts into the interior wall of the conduit to maintain the connector in position. Thus, as connector 10 with ferrule end 24 is inserted into conduit end 18 and threadably engaged by clockwise rotation (counter-clockwise rotation in the view of FIG. 4), low point 32 is a leading edge in the direction of threadable engagement and high point 34 is a trailing edge in the direction of engagement. However, as is shown most clearly in FIG. 4, undesired loosening of connector ferrule end 24 from within conduit 12 is substantially prevented by the barb at high point 34 biting into the interior wall of the conduit with any attempts to rotate ferrule end 24 out of the conduit (i.e., clockwise rotation of ferrule 24 with respect to conduit 12 in FIG. 4). This locks the connector on the conduit and thereby avoids loosening during conduit movement or vibration.

A resilient seat such as washer 36 with an inner seat surface 35 and an outer seat surface 37 is adapted to fit with its inner diameter snugly engaged onto outer surface 28 of ferrule 24. As shown in FIG. 3, the resilient seat is passed over both sets of arcuate segments 26 so as to fit snugly onto ferrule body surface 27 between ridge 22 and the first segments 26 and to enable inner seat surface 35 to butt against annular ridge 22. As conduit end 18 is threadably engaged onto the ferrule end, outermost edge 38 resiliently engages in and sealingly terminates within the seat member by slightly cutting and penetrating outer seat surface 37. This provides a secure smoke tight, water tight and dust tight seal and termination for conduit 12.

It is preferred that seat 36 be of sufficient thickness to insure that even in the undesired event of a non-uniformly cut conduit end 18, the conduit end will sealingly engage with the seat member around the entire perimeter of conduit end edge 38. Also, seat 36 must be of a suitable resilient material so that conduit end edge 38 will penetrate slightly within the seat, or at least depressingly engage and slightly cut the seat surface as shown in FIG. 3. As an example, seat 36 may be formed of a copolymer of polyethylene and polypropalene of about 70 Durometer, with a thickness of about 0.25 inch, and an inner diameter of about 7–10% less than the outer diameter of ferrule body surface 27.

While the preferred embodiment is shown in the drawings and described herein, other modifications may be made in accordance with these principles to obtain the advantages of this invention. As an example, arcuate segments 26 could be formed of a continuous member on ferrule outer surface 28 rather than the discontinuous, discrete two sets of segments shown in FIGS. 2 and 4. The arcuate segments could be moved closer together which would have a tendency to pull the conduit together causing the conduit to lock on the ferrule, or the segments could be moved further apart causing a compression or reduction of the conduit's internal diameter, again locking the conduit onto the ferrule. A series of ramps 30 forming barbs could be provided instead of only two, and the barbs could be formed of double triangles or other shapes other than the illustrated ramps. Also, the washer-type resilient member illustrated herein could be replaced by an O-ring resilient member fitted within an annular groove in the abutting face of ridge 22. As ferrule end 24 is inserted into the conduit, edge 38 would then be resiliently seated within the O-ring in the same manner as illustrated in FIG. 3 with respect to seat member 36.

Further, a nylon ring or other resilient material ring instead of the first or other arcuate segment on the ferrule, or a resilient material coating on the segments, could be used to sealingly engage with a conduit groove wall within the conduit interior and also reduce vibration. An external cup or sleeve with internal convolutions matching the conduit and sealingly engaged with the conduit outer surface also may be used. Such an external cup or sleeve could be combined with the furrule to prevent the conduit from possibly expanding and separating from the connector where such conduit expansion is believed possible. Seat 36 or an O-ring resilient member could be used with such a combination.

The foregoing detailed description has been given for clearness of understanding only, and no unnecessary limitations should be understood therefrom, as modifications will be obvious to those skilled in the art.

What is claimed is:

1. A connector for an air and liquid tight, electrical conduit formed of a plurality of interlocked sections and having an interior wall of arcuately formed members, said connector comprising:

an elongated hollow body having an annular ridge projecting from the outer surface of said body and intermediate a threadable mating body end and a ferrule end for insertion into said conduit;

a plurality of spatially separted arcuate segments formed on the exterior surface of said ferrule and corresponding to said conduit arcuately formed members so as to enable threadable engagement of said ferrule with one end of said conduit;

an annular seat member with an inner seat surface and an outer seat surface and mounted on said ferrule with said inner seat surface in abutting engagement against said annular ridge; and said annular seat member formed of resilient material to enable the entire perimeter of said conduit end to depressingly engage and penetrate said outer seat surface to sealingly terminate said conduit end within said annular seat member upon threadable engagement of said ferrule with said conduit and thereby provide a smoke tight, water tight and dust tight seal and termination for said conduit.

2. A connector according to claim 1, including at least one raised portion projecting from at least one of said arcuate segments to bitingly engage said conduit interior wall and thereby maintain the connector within the conduit.

3. A connector according to claim 1, wherein said spatially separate arcuate segments are formed in two groups on respective opposite surfaces on said ferrule.

4. A connector according to claim 1, wherein said annular seat member is formed of a resilient material of about 70 Durometer.

5. A connector according to claim 4, wherein said annular seat member is formed of a copolymer and includes an inner diameter of about 7–10% less than the outer diameter of said ferrule exterior surface.

6. A connector for an air and liquid tight, flexible electrical conduit formed of a plurality of interlocked sections having an interior wall of circular spirally formed members, said connector comprising:

an elongated hollow cylindrical body having an annular ridge extending around the exterior surface of said cylindrical body and a threaded portion extending from said annular ridge to a first end of said cylindrical body;

a ferrule portion extending from said annular ridge to a second end of said cylindrical body adapted for insertion into said flexible conduit;

a plurality of spatially separated circular arcuate segments formed on the exterior surface of said ferrule corresponding to said circular spirally formed members so as to enable threadable engagement of said ferrule within one end of said conduit;

raised projections on said circular arcuate segments for bitingly engaging said conduit interior wall and substantially locking said connector on said conduit;

an annular seat member with an inner seat surface and an outer seat surface and mounted on said ferrule with said inner seat surface in abutting engagement against said annular ridge; and said annular seat member formed of resilient material to enable the entire perimeter of said conduit end to depressingly engage and penetrate said outer seat surface to sealingly terminate said conduit end within said annular seat member upon threadable engagement of said ferrule with said conduit and thereby provide a smoke tight, water tight and dust tight seal and termination for said conduit.

7. A connector according to claim 6, wherein said circular arcuate segments are formed in two groups on respective opposite surfaces of said ferrule.

8. A connector according to claim 7, wherein said raised projections each includes a ramp extending from a respective arcuate segment in a direction away from the direction of threaded engagement of said ferrule onto the conduit to form a cutting edge to bite into the conduit interior wall.

9. A connector according to claim 8, wherein said raised projections are formed on at least one of the arcuate segments adjacent said annular ridge in one of said groups.

10. A connector according to claim 9, wherein said annular seat member is formed of a copolymer material of about 70 Durometer and includes an inner diameter of about 7–10% less than the outer diameter of said ferrule exterior surface.

11. A gas tight and liquid tight, flexible electrical conduit and connector, including a flexible metal conduit formed of a plurality of consecutively combined interlockingly joined, short ring sections, the combination being flexible at the individual interlocking joints but with the joints sealing the conduit interior from the environment on the conduit exterior, and with the flexible metal conduit having sealed connectors at each end, each of said connectors comprising an elongated hollow body having an annular ridge projecting from the outer surface of said body and intermediate a threadable mating body end and a ferrule end for insertion into said conduit, a plurality of spatially separated arcuate segments formed on the exterior surface of said ferrule and corresponding to said conduit arcuately formed members so as to enable threadable engagement of said ferrule with one end of said conduit, and an annular seat member with an inner seat surface and an outer seat surface and mounted on said ferrule with said inner seat surface in abutting engagement against said annular ridge, and said annular seat member formed of resilient material to enable the entire perimeter of said conduit end to depressingly engage and penetrate said outer seat surface to sealingly terminate said conduit end within said annular seat member upon threadable engagement of said ferrule with said conduit and thereby provide a smoke tight, water tight and dust tight seal and termination for said conduit.

* * * * *